United States Patent [19]
Adams

[11] 3,773,337
[45] Nov. 20, 1973

[54] BELLOWS SEAL

[75] Inventor: William V. Adams, Kalamazoo, Mich.

[73] Assignee: Durametallic Corporation, Kalamazoo, Mich.

[22] Filed: Jan. 17, 1972

[21] Appl. No.: 218,392

[52] U.S. Cl. .......................... 277/89, 277/42, 277/90
[51] Int. Cl. ............................................... F16j 15/34
[58] Field of Search ................. 277/81, 85, 89, 123, 277/91, 93, 935 D, 190, 191, 41, 42

[56] References Cited
UNITED STATES PATENTS

| | | | |
|---|---|---|---|
| 2,881,014 | 4/1959 | Amirault et al. | 277/89 |
| 2,871,072 | 1/1959 | Parks et al. | 277/203 |

*Primary Examiner*—Samuel B. Rothberg
*Assistant Examiner*—Robert I. Smith
*Attorney*—Woodhams, Blanchard and Flynn

[57] ABSTRACT

A mechanical seal construction comprising a pair of seal elements having mutually contacting sealing faces, one seal element being fixed with respect to a wall and the other seal element being capable of rotation in response to rotation of a shaft. A further element is nonrotatably connected to the shaft and is sealingly interconnected to said other seal element by a flexible bellows-type seal. Said further element comprises an axially split two-part collar surrounding and fixedly connected to the shaft and having a suitable packing associated therewith for sealingly engaging the shaft. The packing, in a preferred embodiment, comprises an annular ringlike sealing member constructed of multilayer graphite material compressed axially between the two-part collar. The collar has wedge means thereon for causing the sealing member to be radially compressed against the shaft to sealingly engage same.

8 Claims, 3 Drawing Figures

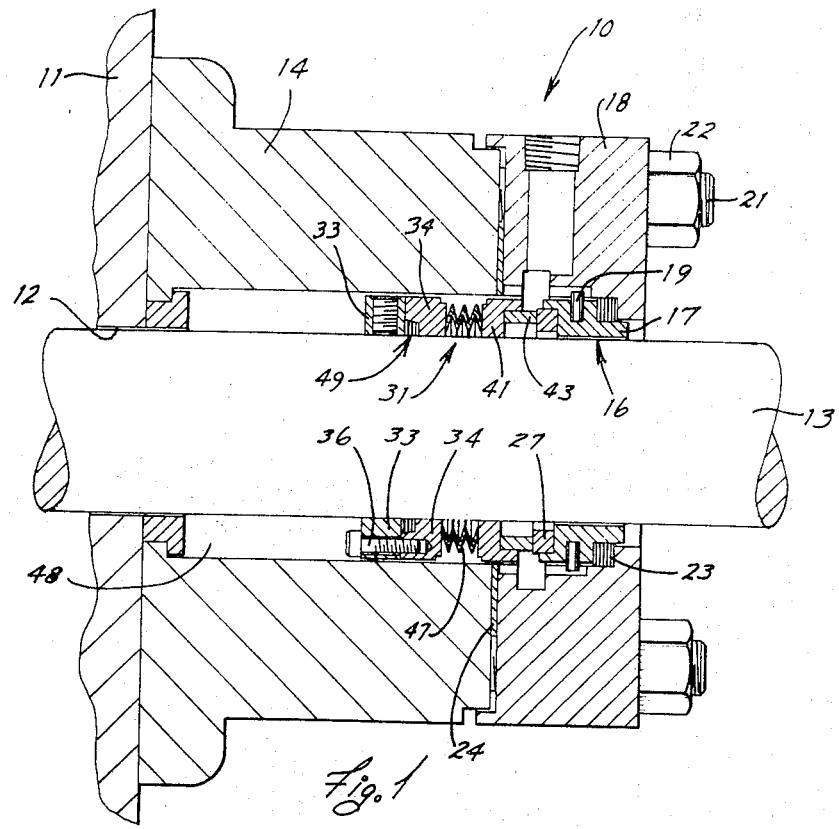
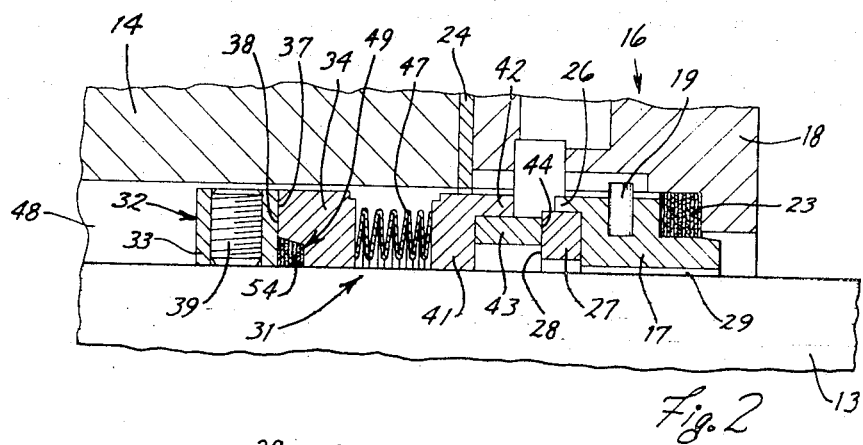
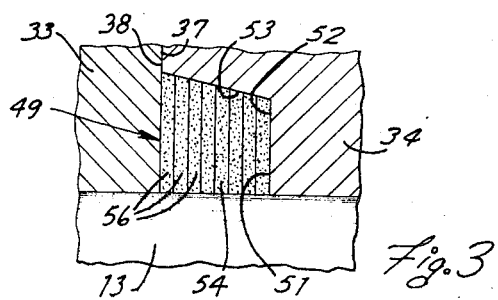

BELLOWS SEAL

CROSS-REFERENCE TO RELATED APPLICATION

This application is related to my copending application Ser. No. 837,061, filed July 27, 1971, and entitled "MULTILAYER GRAPHITE SEAL RING," now U.S. Pat. No. 3,655,206.

FIELD OF THE INVENTION

This invention relates to a mechanical seal construction and, in particular, to an improved bellows-type seal construction utilizing a shaft packing, preferably of multilayer graphite material, for sealingly connecting one end of the bellows to the shaft.

BACKGROUND OF THE INVENTION

Bellows-type mechanical seal constructions of various forms have been extensively utilized on pumps and related devices for creating a sealed relationship between a relatively rotatable shaft and a surrounding wall or housing. However, the known bellows-type seal constructions have possessed structural and operational limitations which have limited their scope of usage for extremes of operating conditions.

For example, when the seal construction is to be utilized through relatively wide temperature ranges, such as within the range of approximately between −65° F. to approximately 500° F., then the bellows is normally sealingly connected to the shaft by means of a clamping collar which has a conventional elastomeric (or Teflon) packing ring associated therewith for sealingly engaging the cylindrical peripheral surface of the shaft. While these bellows seal constructions do operate satisfactorily within this temperature range, nevertheless the elastomeric packing rings are not useable when the temperature exceeds 500° F. since the elastomers rapidly deteriorate when exposed to such a high temperature. Also, many otherwise desirable elastomers have an upper temperature limit of only approximately 200°-250° F. The elastomers also tend to harden excessively when exposed to temperatures in the neighborhood of or below −65° F., whereby they lose their resiliency and are incapable of effectively functioning as a seal or packing. Thus, the known bellows-type seal constructions utilizing an elastomeric packing are successfully usable only within a limited temperature range, and are not successfully usable in situations where the temperatures exceed this range.

In order to overcome the problems associated with the use of elastomeric packings, particularly when the bellows-type seal construction is to be utilized in temperatures in excess of 500° F., the bellows-type seal construction has generally necessarily required that the packing be of an entirely different type in order to operate under these high temperature conditions. For this purpose, the bellows-type seal construction has generally been provided with a metal or asbestos gasket positioned between the bellows clamping collar and the shaft for creating a sealed relationship therebetween. However, such metal or asbestos gaskets can be sealingly related to the shaft only by providing a stepped shaft arrangement so that the metal or asbestos gasket is axially clamped between the clamping collar and a shoulder formed on the shaft. This arrangement is obviously undesirable since it substantially increases the cost of the overall assembly in that it requires the provision of a stepped shaft, rather than utilizing a shaft having a substantially uniform diameter. Further, the positioning of the seal assembly is greatly restricted since it can be positioned only where such a step or shoulder exists. Still further, the necessity of providing a stepped shaft often substantially complicates the mounting of the bellows-type seal construction between the shaft and the surrounding wall, and also makes maintenance and/or repair of the seal assembly, particularly at a job site, extremely difficult.

It has also been discovered that packings constructed of asbestos, when utilized for extended periods of time at temperatures above 600° F., become extremely hard, whereby the asbestos or asbestos combination no longer effectively functions as a seal.

Thus, it is an object of the present invention to provide an improved mechanical seal construction, particularly a bellows-type seal construction, having an improved packing coacting between the bellows collar and the shaft for creating a sealed relationshp therebetween while also permitting the seal construction to be substantially universally utilized under substantially all environmental conditions.

A further object of the present invention is to provide an improved bellows-type seal construction, as aforesaid, which can be utilized under conditions of extremely high or extremely low temperatures, particularly above 600° F. and below −100° F., which can be utilized with all types of corrosive and abrasive fluids, and which can be successfully used in radioactive environments.

Still a further object of the present invention is to provide an improved bellows-type seal construction, as aforesaid, which utilizes a packing coacting between the bellows collar and the shaft for creating a desirable sealed relationship therebetween, which packing is able to coact directly with the periphery of the shaft without requiring the use of a stepped or shouldered shaft.

Another object of the present invention is to provide an improved bellows-type seal construction, as aforesaid, wherein the packing ring disposed for coaction between the shaft and the bellows collar is constructed of a multilayer or laminated graphite material, with said graphite shaft packing being compressed between two substantially transverse and parallel supporting surfaces, and wedge means coacting with the packing ring for simultaneously radially and axially compressing the graphite packing into sealing engagement with the periphery of the shaft.

Other objects and purposes of this invention will be apparent to persons acquainted with devices of this type upon reading the following specification and inspecting the accompanying drawings.

BRIEF DESCRIPTION OF THE DRAWINGS

FIG. 1 is a central sectional view of a mechanical seal assembly constructed according to the present invention.

FIG. 2 is an enlarged fragmentary sectional view of a portion of FIG. 1.

FIG. 3 is an enlarged fragmentary sectional view of a portion of FIG. 2 and specifically illustrating therein the improved shaft packing of the present invention.

Certain terminology will be used in the following description for convenience in reference only and will not be limiting. The words "upwardly," "downwardly," "leftwardly" and "rightwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Further, the terminology "multilayer" as utilized herein includes not only an annular packing ring constructed of a plurality of individual platelike members axially stacked together, but also a continuous flat member wound to form either a helical or a concentric spiral. Further, the individual layers of the packing ring may be come at least partially bonded together when a compression force is applied thereto.

SUMMARY OF THE INVENTION

In general, the objects and purposes of the invention are met by providing a mechanical seal construction for use between a wall and a shaft extending therethrough and rotatable relative thereto, and wherein the mechanical seal construction has a pair of sealing members having mutually contacting sealing faces. One of the sealing members is fixed to the wall whereas the other sealing member is capable of rotation in response to rotation of the shaft. The other sealing member is fixedly and sealingly connected to one end of an elongated flexible bellows seal surrounding the shaft, and the other end of the bellows seal is fixedly and sealingly connected to a clamping collar. The champing collar surrounds and is fixedly clamped to the shaft and is provided with a suitable annular packing ring associated therewith for sealingly engaging the shaft.

In a preferred embodiment of the invention, the collar is of a two-piece construction and includes two axially separable rings which are normally fixedly held together. One of the collar rings has an annular recess formed therein directly adjacent the other collar ring and encircling the shaft, which annular recess has a tapered outer peripheral wall. A packing ring, preferably of a multilayer graphite material, is disposed within the recess and is axially clamped and compressed between the two collar members, whereby the tapered outer surface of the recess acts as a wedge and causes the packing ring to be radially compressed into sealing engagement with the periphery of the shaft. The shaft is preferably provided with a substantially uniform diameter in the region of the packing ring so that the packing ring is urged radially into sealing engagement therewith.

DETAILED DESCRIPTION

FIG. 1 illustrates therein a mechanical seal assembly 10 which is commonly referred to as an "inside" seal and is associated with an apparatus which includes a wall 11 having an opening 12 through which extends a rotatable shaft 13. The seal assembly 10 includes a housing 14 secured to the wall 11 by conventional means, such as bolts (not shown).

The housing 14 has a stationary seal means 16 associated therewith which, as illustrated in FIGS. 1 and 2, includes a stationary annular seal member 17 positioned in surrounding relationship to the shaft 13 and nonrotatably supported by a stationary annular member 18. The annular member 18, commonly referred to as a gland, is fixedly connected to the housing 14 by any conventional means, such as by the use of threaded studs 21 and nuts 22. The annular seal member 17, commonly referred to as a gland insert, is nonrotatably connected to the gland 18 by means of one or more locking pins 19 which are fixedly secured to the gland insert 17 and extend radially into slots formed in the gland 18. Suitable sealing means 23 and 24, such as gaskets, are provided between the gland insert 17 and the gland 18 and the housing 14.

The gland insert 17 has an axially projecting flange 26 on the inner end thereof which forms an annular recess in the inner end of the insert. An annular face ring 27 is disposed within the recess formed in the gland insert 17, with the face ring 27 being closely surrounded by the flange 26. The face ring 27 is nonrotatably connected to the gland insert 17, such as by the creation of an interference fit between the flange 26 and the face ring 27. The face ring 27, which in a preferred embodiment is constructed of tungsten carbide, has an accurately finished radial seal surface 28 formed on the inner axial end thereof. The gland insert 17 and face ring 27 are suitably radially spaced from the rotatable shaft 13 to define an annular clearance space 29 therebetween to permit angular or lateral movement or deflection of the shaft relative to the wall 11.

The stationary seal means 16 is disposed for sealing coaction with a rotatable seal means 31 encircling and rotatable with the shaft 13. The rotatable seal means 31 includes an annular collar assembly 32 fixedly secured to the shaft 13. The collar assembly 32 is of a two-piece construction and includes first and second ringlike collar members 33 and 34 encircling the shaft and axially fixedly connected by any suitable means, such as a plurality of screws 36. The first and second ringlike collar members 33 and 34 have substantially radial end faces 37 and 38, respectively, formed thereon and abuttingly engaged when the collar members are clampingly held together by the screws 36. The first collar member 33 is also provided with a radially movable set screw 39 which, in a conventional manner, is adapted to be clampingly engaged with the periphery of the shaft 13 for axially and nonrotatably securing the collar assembly 32 to the shaft 13.

The rotatable seal means 31 also includes a rotatable annular seal member 41 positioned in surrounding relationship to the shaft 13. The rotatable seal member 41 has a cuplike configuration and includes an annular flange 42 extending axially toward the gland insert 17. The flange 42 forms an annular recess in the outer axial end of the seal ring 41. A face ring 43 is axially seated within the recess formed in the rotatable seal member 41 and is nonrotatably connected to the seal member 41, such as by the creation of an interference fit between the flange 42 and the face ring 43. The face ring 43 is provided with an accurately finished radial seal surface 44 on the axial end thereof, which seal surface 44 is urged against the seal surface 28 to form a rotatable sliding seal therebetween. The seal ring 43, like the seal ring 27, is also preferably constructed from tungsten carbide.

The annular seal member 41 is nonrotatably and sealingly connected to the collar assembly 32 by means of an intermediate bellows seal 47. The bellows seal 47, as illustrated in FIGS. 1 and 2, encircles the shaft 13 and extends axially between the second collar member 34 and the rotating seal member 41. One end of the bellows 47 is fixedly and sealingly connected, as by welding, to the collar member 34, whereas the other end of the bellows 47 is fixedly and sealingly connected to the annular seal member 41, such as by welding. The bellows seal 47 is of substantially conventional construction and includes a plurality of individual bellows plates, preferably constructed from stainless steel, with the adjacent bellows plates alternately having their inner and outer peripheries welded together around the complete peripheries thereof to provide a fluid-tight joint while at the same time permitting the bellows to have the desired flexibility. Such bellows are well known, and thus further description of same is not believed necessary.

The rotatable seal means 31 is also provided with resilient means for urging the annular seal member 41 toward the gland insert 17 to thus maintain the seal faces 28 and 44 in sealing engagement with one another. The resiliency of the bellow may be sufficient for this purpose. However, the seal assembly may, if necessary, be provided with a conventional coil spring (not shown) encircling the shaft 13 and positioned, as is conventional, with the opposite ends thereof in engagement with the collar assembly 32 and the annular seal member 41. Such a coil spring is normally maintained under compression to continuously resiliently urge the face ring 43 into engagement with face ring 27. Also, the spring can, if desired, be positioned in the interior of the bellows to prevent the spring from being contacted by the fluid contained within the chamber 48.

To prevent the fluid within chamber 48 from gaining access into the interior of the bellows 47, the collar assembly 32 is provided with packing means 49 associated therewith and disposed for creating a sealing engagement with the periphery of the shaft 13. The packing means 49 of the present invention includes an annular recess 51 formed in the collar member 34, which recess 51 extends axially inwardly from the transverse end face 38 and is disposed to directly surround the periphery of the shaft 13. The bottom of the recess 51 is defined by a substantially radial base wall 52 which lies within a plane substantially perpendicular to the longitudinally extending axis of the shaft 13. The recess 51 also has a sidewall 53 which slopes inwardly toward the shaft periphery as it extends axially away from the end surface 38. The tapered sidewall 53 thus comprises a truncated conical surface. The other axial end of the recess 52 is substantially closed by the radial end face 37 of the collar member 33 when the collar members 33 and 34 are clampingly and axially connected by the screws 36. The end face 37, which is substantially parallel to the base wall 52, thus coacts with the base wall 52 and the tapered sidewall 53 to form a substantially closed annular recess disposed in communication with and in surrounding relationship to the shaft 13.

The packing means 49 also includes an annular packing ring 54 which is designed to totally occupy the recess 51. The packing ring 54, in the preferred embodiment of the invention, is constructed of a multilayer, laminated construction and is preferably formed from a plurality of thin washer-like plates 56 of graphite. The plates 56, in the illustrated embodiment, are axially stacked. The individual graphite plates 56 preferably have an axial thickness of approximately 0.005 to 0.010 inch. Alternately, rather than using a plurality of individual plates 56, the packing ring 54 can be formed from a continuous flat member wound in a helix to form an axially extending spiral member, with the axial thickness of the individual plates of the spiral member corresponding to the axial thickness of the individual plates 56. As a still further alternative, the packing ring 54 can be formed from a continuous flat member wound radially to form a concentric spiral member, with the axial width of the individual coils of the spiral member corresponding to the axial length of the packing ring. These later-mentioned constructions are disclosed in greater detail in my copending application Ser. No. 837,061.

The packing ring 54 is initially positioned within the recess 51 between the opposed axial support surfaces 37 and 52. Thus, when the collars 33 and 34 are axially moved together, as by tightening of the screws 36, the packing ring 54 is axially compressed between the surfaces 37 and 52, which axial compression is sufficient to permit the surfaces 37 and 38 to be disposed in abutting engagement with one another. As the packing ring 54 is being axially compressed due to movement of surface 37 toward the back support surface 52, the tapered sidewall 53 exerts a wedging action on the packing ring 54 causing same to be radially compressed inwardly so that it is tightly compressed against and sealingly engages the external peripheral surface of the shaft 13. Since shaft 13 is of substantially uniform diameter in the region of the collar assembly 32, the packing ring 54 effects a radially directed sealing engagement with the shaft periphery.

In a preferred embodiment of the invention, the tapered peripheral surface 53 extends at an angle relative to the axial direction of the shaft 13 which lies within the range of 5° and 25°, and preferably is approximately 15°. Also, while the rear surface 52 has been disclosed as being substantially radial with respect to the shaft axis, nevertheless this surface can deviate slightly from this desired transverse relationship, so long as this angular deviation is realtively small and preferably does not exceed approximately 10°. However, forming the rear support surface 52 radially with respect to the shaft axis is preferred.

The packing ring 54, as explained above, is of a graphite material and preferably of a multilayer or laminated graphite material sold under the name "Grafoil" (trademark). It has been experimentally discovered that a successful seal can be achieved if the graphite has an initial density of between 35 and 75 pounds per cubic foot. After the graphite packing ring has been installed within the collar assembly and pressed between the surfaces 37 and 52, the packing ring undergoes limited compression so that the actual density of the packing ring 54 when installed is approximately between 40 and 120 pounds per cubic foot. While graphite material deviating from these density ranges can obviously be used if special attention is paid to the magnitude of compression, nevertheless the above ranges represent the densities which have been discovered to provide the most efficient and most durable sealing relationship.

For further explanation and discription of the graphite material and its physical properties, and of the manner in which it coacts with the wedge surface, reference is made to my copending application Ser. No. 837,061.

OPERATION

The operation of the mechanical seal construction of the present invention will be briefly described to insure a complete understanding thereof.

During operation of the seal assembly 10, the shaft 13 will be rotated relative to the wall 11 and a pressurized fluid will be contained within the chamber 48. To prevent the pressurized fluid from escaping from the chamber 48, a seal is provided by the sliding contact between the relatively rotating seal surfaces 28 and 44, which surfaces are maintained in snug sliding contact with one another due to the resilient urging of the bellows 47. Further, since the rotating seal member 41 is not fixedly mounted on the shaft but is slightly radially spaced therefrom, the seal member 41 and the seal ring 43 mounted thereon will freely float relative to the shaft so that the seal surface 44 will always be maintained in proper seating and sealing engagement with the seal surface 28.

Due to the clearnace and relative movement of seal member 41 relative to the shaft, there is additionally provided the bellows 47 sealingly connected between the collar member 34 and the seal member 41 for preventing the pressurized fluid within chamber 48 from escaping between the shaft and the seal member 41. Also, to prevent the pressurized fluid in chamber 48 from escaping along the surface of the shaft between the shaft and the collar assembly 32, same is additionally provided with the packing means 49 associated therewith, which packing means sealingly engages the periphery of the shaft 13 and prevents fluid from escaping therealong. The packing means 49, in conjunction with the bellows 47, thus effectively prevents fluid within chamber 48 from escaping along the surface of the shaft.

While the seal assembly 10 illustrated and described utilizes coacting seal members having transverse seal surfaces disposed in relatively rotatable and sliding engagement with one another, it will be recognized that the bellow seal construction of the present invention, particularly incorporating therein the bellows seal 46 and the packing means 49, can also be utilized for sealingly connecting two relatively movable but nonrotatable members, in which case the provision of the relatively rotatable sliding seal faces would not be necessary.

It will also be recognized that the collar assembly 32 can be modified so that the collar members 33 and 34 are resiliently urged, as by springs, into engagement with one another to axially and radially compress the packing ring 54 therebetween to cause same to sealingly engage the periphery of the shaft in substantially the same manner as disclosed in my abovementioned copending application Ser. No. 837,061. For example, in this proposed modification, the collar member 34 can be fixedly secured to the shaft, as by means of a set screw, and the collar member 33 can be resiliently urged, as by springs, toward the collar member 34. The collar member 33 can have a suitable projection thereon adapted to extend into the leftward end of the recess 51 for causing the packing ring 54 to be axially and radially compressed between the collar members and the shaft periphery.

While the rotating seal member 41 has been disclosed as supported by the bellows 47, with the bellows holding the seal member 41 substantially nonrotatable relative to the shaft 13, it will be appreciated that other structure, such as a pin-and-slot connection, could be provided between the member 41 and the shaft 13 to nonrotatably connect same.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal construction, which can be utilized under conditions of extremely high or extremely low temperatures, particularly above 600° F. and below −100° F., and designed for use between a wall and a shaft extending therethrough and rotatable relative thereto, said mechanical seal construction having a pair of seal elements having mutually contacting sealing faces, one seal element being fixed with respect to said wall and the other seal element being capable of rotation in response to rotation of said shaft, the improvement comprising:

annular collar means surrounding and fixedly secured to said shaft, said collar means including an annular recess disposed directly adjacent and in surrounding relationship to said shaft;

elongated flexible bellows means extending between and sealingly connected to said other seal element and said collar means for supporting said other seal element and permitting same to move relative to said collar means, said bellows means including a plurality of metal plates alternately having their inner and outer peripheries sealingly connected;

sealing means coacting between said collar means and said shaft for creating a sealed relationship therebetween, said sealing means including an annular ringlike sealing member constructed of multilayer graphite material and disposed within said annular recess; and said collar means including means for causing both axial and radial compression of said graphite sealing member, said last-mentioned means including a substantially conical wall disposed in surrounding relationship to and partially defining said annular recess, said conical wall being slightly tapered relative to the axis of said shaft for causing said sealing member to be radially compressed into sealing engagement with the periphery of said shaft.

2. A seal construction according to claim 1, wherein said collar means includes first and second ringlike collar members surrounding and fixedly secured to said shaft, said first and second collar members respectively having first and second surfaces formed thereon, said first and second surfaces being substantially opposite one another and substantially perpendicular to the longitudinally extending axis of said shaft;

said collar means also including means for nonrotatably interconnecting said first and second collar members while permitting said first and second collar members to be moved axially toward one another so that said first and second surfaces are axially moved toward one another;

said annular recess extending outwardly from the inner peripheral surface of said first collar member and extending axially from said first surface part way through said first collar member, said first collar member having an annular support wall defining one end of said recess, said annular support wall being substantially perpendicular to the longitudinal axis of said shaft; and said annular sealing member being disposed within said annular recess and axially compressed between said support wall and said second surface.

3. A seal construction according to claim 2, wherein said a conical wall extends between said first surface and said support wall for defining the outer periphery of said annular recess, said conical wall tapering inwardly toward the axis of said shaft as it extends from said first surface axially toward said support wall, whereby said annular sealing member is simultaneously axially and radially compressed as said first and second collar members are axially moved toward one another.

4. A seal construction according to claim 3, wherein said multilayer sealing member is of laminated construction and includes a plurality of thin washerlike plates of graphite having a thickness of approximately 0.005 to 0.010 inch.

5. A seal construction according to claim 3, wherein said first collar member has a further surface disposed on the side thereof opposite said first surface, and said bellows means having one end thereof fixedly and sealingly connected to said first collar member adjacent said further surface.

6. A seal construction according to claim 3, wherein said conical wall extends at an angle of approximately 15° relative to the axis of said shaft.

7. A seal construction according to claim 1, wherein said conical wall extends at an angle of approximately 15° relative to the axis of said shaft.

8. A seal construction according to claim 1, wherein said collar means includes a pair of opposed and substantially parallel walls defining the opposite sides of said recess, said walls being substantially perpendicular to the axis of said shaft, and said conical wall extending between said pair of side walls and defining the bottom of said recess, said conical wall extending at an angle of between approximately 5° and 25° relative to the axis of said shaft.

* * * * *